(12) United States Patent
Zhou

(10) Patent No.: US 10,936,930 B2
(45) Date of Patent: Mar. 2, 2021

(54) WEARABLE DEVICE

(71) Applicant: BOE TECHNOLOGY GROUP CO., LTD, Beijing (CN)

(72) Inventor: Zilong Zhou, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 207 days.

(21) Appl. No.: 16/014,845

(22) Filed: Jun. 21, 2018

(65) Prior Publication Data
US 2019/0205721 A1   Jul. 4, 2019

(30) Foreign Application Priority Data

Jan. 3, 2018   (CN) .......................... 201810005319.1

(51) Int. Cl.
*G06F 1/16*        (2006.01)
*G06K 19/077*   (2006.01)
(Continued)

(52) U.S. Cl.
CPC ... *G06K 19/07762* (2013.01); *A41D 31/0005* (2013.01); *A44C 5/0015* (2013.01);
(Continued)

(58) Field of Classification Search
CPC ....... A44C 5/00; A44C 5/0007; A44C 5/0015; A44C 5/06; A44C 5/0084; A44C 9/02; Y10T 24/4782; G04B 37/1486; G04B 37/16; G04B 37/18; G04B 37/20; G06K 19/07762; G06F 1/1601; G06F 1/163; G06F 2200/1612
(Continued)

(56) References Cited

U.S. PATENT DOCUMENTS 3,677,450 A  *  7/1972  Hodgson ............... A44C 5/0015
                                                                 224/175
4,186,425 A  *  1/1980  Nadimi ............... A44C 15/0015
                                                                 362/104
(Continued)

FOREIGN PATENT DOCUMENTS

CN       105045376 A       11/2015
CN       105940445 A         9/2016
(Continued)

OTHER PUBLICATIONS

First Office Action dated Jun. 27, 2019 corresponding to Chinese application No. 201810005319.1.

*Primary Examiner* — Jack W Lavinder
(74) *Attorney, Agent, or Firm* — Nath, Goldberg & Meyer; Joshua B. Goldberg; Stephanie F. Majkut

(57) ABSTRACT

The present disclosure provides a wearable device comprising: a connector and at least two bodies, the connector is used to connect two of the at least two bodies, an opening structure is formed between portions of the two of the at least two bodies connected by the connector. The opening structure can reduce an area covered by the wearable device on the user's skin. The effect of the wearable device on the heat dissipation of the user's skin can be reduced. Compared with the non-hollow wearable device, the wearable device with the open structure is light in weight, thus the overall weight of the wearable device is reduced.

7 Claims, 2 Drawing Sheets

(51) Int. Cl.
  *A41D 31/00* (2019.01)
  *A44C 5/00* (2006.01)
  *A44C 9/02* (2006.01)

(52) U.S. Cl.
  CPC .............. *A44C 5/0084* (2013.01); *A44C 9/02* (2013.01); *G06F 1/1601* (2013.01); *G06F 1/163* (2013.01); *G06F 2200/1612* (2013.01)

(58) Field of Classification Search
  USPC .................................. 368/281, 282; 362/104
  See application file for complete search history.

(56) References Cited

U.S. PATENT DOCUMENTS

2015/0124567 A1* 5/2015 Liao ..................... A44C 5/0053
  368/10
2016/0255922 A1* 9/2016 Hatanaka ................. A44C 5/06

FOREIGN PATENT DOCUMENTS

| CN | 106154555 | A | 11/2016 |
| CN | 106462326 | A | 2/2017 |
| CN | 106920471 | A | 7/2017 |
| EP | 1175840 | A2 | 1/2002 |

* cited by examiner

WEARABLE DEVICE

CROSS-REFERENCE TO RELATED APPLICATION

This application claims the priority of China Patent Application No. 201810005319.1, filed in China on Jan. 3, 2018, the entire contents of which are hereby incorporated by reference.

TECHNICAL FIELD

The present disclosure relates to the field of smart wear technology, and in particular to a wearable device.

BACKGROUND

With the rapid development of wearable technologies, there are more and more types of wearable devices and functions are provided, so that the user has a better user experience in using the wearable device. Current wearable devices, such as watches or wristbands, are generally non-hollowed structures. Accordingly, in the process that the user wears the wearable device, the wearable device covers a large area of the user's skin, thereby affecting the heat dissipation of the user's skin. In addition, in order to achieve functions such as detecting the heart rate, steps, and speed, a plurality of functional modules is needed to be provided in current wearable devices, which results in the overall weight of the wearable device being heavy.

SUMMARY

The present disclosure provides a wearable device, comprising: a connector, and at least two bodies, the connector is used to connect two of at least two bodies, an opening structure is formed between portions of two of at least two bodies connected by the connector.

Optionally, the body has an arc shape and the wearable device has a cylindrical shape.

Optionally, a material of the connector is an elastic material.

Optionally, the connector is in a shape of a straight strip or a bent strip.

Optionally, the connector is a U-shaped, a V-shaped, or a W-shaped bent strip.

Optionally, the body comprises a main body portion and a display device provided on the main body portion; the connector has a hollow structure in which a transmission line is disposed.

Optionally, the wearable device further comprises a curved restriction bar, the restriction bar is connected to a periphery of the body from one side of the wearable device where a wear part enters.

Optionally, a first protrusion is provided on the periphery of the body from one side of the wearable device where the wear part enters, and a first groove is provided on the restriction bar; the first protrusion is engaged with the first groove; or size of the first groove is larger than size of the first protrusion, so that the first protrusion is slidably connected with the first groove.

Optionally, a second protrusion is provided on a surface of the display device that is attached to the main body portion, and a second groove is provided on the main body portion; the second protrusion is engaged with the second groove; or size of the second groove is larger than size of the second protrusion, so that the second protrusion is slidably connected with the second groove.

Optionally, the main body portion and the display device are connected by magnetic attraction.

DETAILED DESCRIPTION OF THE EMBODIMENTS

To enable those skilled in the art to better understand the technical solutions of the present disclosure, a wearable device provided by the present disclosure will be described in detail below with reference to the accompanying drawings.

Figure 1:
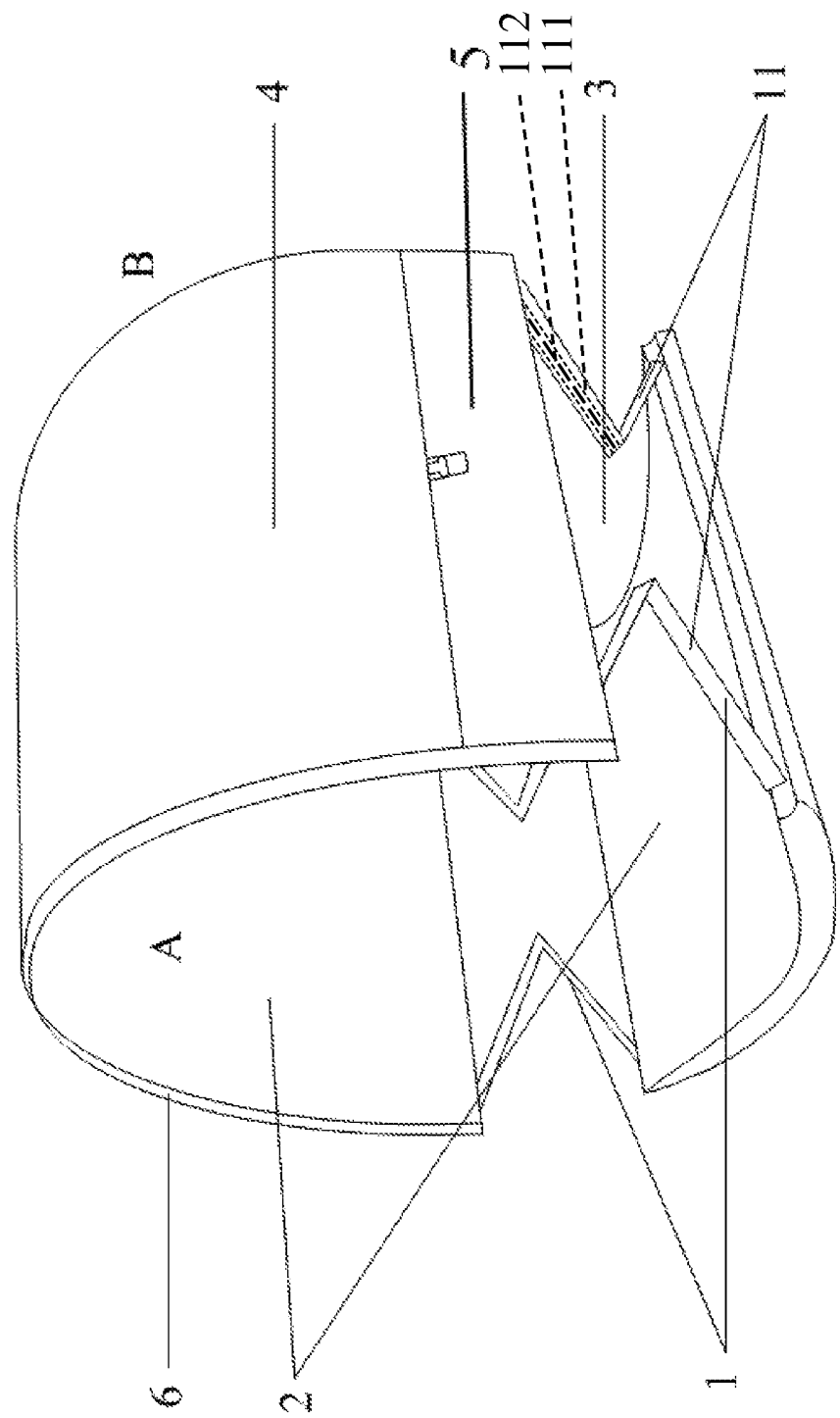
FIG. 1 is a schematic structural view of a wearable device according to an embodiment.

An embodiment of the present disclosure provides a wearable device. As shown in FIG. 1, the wearable device comprises a connector 1 and at least two bodies 2. The connector 1 is used to connect two of bodies 2 (at least two bodies 2). An opening structure 3 is formed between portions of the two bodies 2 (two of at least two bodies 2) connected by the connector 1.

Specifically, as shown in FIG. 1, the embodiment of the present disclosure is described by taking the wearable device including two bodies 2 and two connectors 1 as an example. Two ends of one connector 1 are respectively connected to ends of the two bodies 2, and two ends of the other connector 1 are respectively connected to the other ends of the two bodies 2. Both ends of the two bodies 2 have an opening structure 3. It should be noted that the wearable device may comprise three, four or more bodies 2 and connectors 1.

In the wearable device provided by the embodiment of the present disclosure, by dividing the wearable device into at least two bodies 2 and connecting the two bodies 2 with the connectors 1, an opening structure 3 is formed between portions of the two bodies 2 connected by the connector 1. The opening structure 3 can reduce the coving area of the wearable device on the user's skin, and thus can reduce the effect of the wearable device on the heat dissipation of the user's skin. Moreover, the wearable device having the opening structure 3 has a lighter weight than the wearable device without a hollow structure, so that the overall weight of the wearable device can also be reduced.

As shown in FIG. 1, the body 2 has an arc shape and the wearable device has a cylindrical shape. Specifically, the wearable device may be a hand ring, an arm ring, a foot ring, a leg ring, a ring, a neck ring, or a watch. It should be noted that the wearable device may also be a non-cylindrical structure. For example, the wearable device is a sock, a hat, a headscarf, or glasses. The embodiment of the present disclosure is illustrated by taking the wearable device with a ring structure as an example.

When the wearable device is an arm ring or a leg ring, it is preferable that the wearable device has a hole with diameter thereof is gradually reduced in a direction that the wear part of a user enters the wearable device (for example, from A to B in FIG. 1). In this way, when the wearable device is worn by the user's arm or leg, the wearable device is easy to fit with the user's arm or leg and is easily fixed thereon.

To facilitate the user wearing the wearable device, a material of the connector 1 is an elastic material. Specifically, the elastic material may be polycarbonate (PC), polymethyl methacrylate (PMMA), thermoplastic polyester elastomer (TPEE) or thermoplastic polyurethane elastomer (TPU). The above elastic material not only has better elasticity but also has better transparency and scratch resistance. Correspondingly, the connector 1 has better transparency and scratch resistance.

As shown in FIG. 1, the connector 1 may comprise at least one connecting bar 11, and the connecting bar 11 is in the shape of a straight strip or a bent strip. Specifically, the area of the connecting bar 11 in the shape of a straight strip or a bent strip is small. Correspondingly, and the corresponding connector 1 occupies a small area (between the two bodies 2 connected by the connector 1) occupied by the connector 1 is small. As a result, the area of the opening structure 3 between the two bodies 2 can be increased, so as to further reduce the effect of the wearable device on the heat dissipation of the user's skin, and further reduce the overall weight of the wearable device.

It should be noted that the embodiment of the present disclosure is described by taking the connector 1 comprising two connecting bars 11 as an example. Definitely, it is also possible that the connector 1 comprises three, four or more connecting bars 11. The greater the number of connecting bars 11 is, the stronger the fastness of the connection between the two bodies 2 is. However, the greater the number of connecting bars 11 is, the larger the area (between the two bodies 2 connected by the connector 1) occupied by the connector 1 is. Accordingly, the area of the opening structure 3 between the two bodies 2 is small. That is, the effect of the wearable device on the heat dissipation of the user's skin is great. Therefore, the number of connection bars 11 needs to be determined according to actual conditions.

Preferably, the connecting bar 11 is a U-shaped, a V-shaped, or a W-shaped bent strip. In this way, the connecting bar 11 has good flexibility, and the fastness of the connection between the two bodies 2 can be further improved. The embodiment of the present disclosure is described by taking the connecting bar 11 with a V-shaped structure as an example, and the two connecting bars 11 are disposed opposite to each other. Definitely, it is also possible that two connecting bars 11 are arranged in the same direction.

It should be noted that the connector 1 may also be in a mesh structure. For example, the connector 1 has a honeycomb shape. In this way, the fastness of the connection between the two bodies 2 is better. However, the connector 1 occupies a large area between the parts where the two bodies 2 are connected by the connector 1, so that the wearable device has a greater effect on the heat dissipation of the user's skin.

Further, the body comprises a main body portion 5 and a display device 4 provided on the main body portion 5. The connector 1 has a hollow structure in which a transmission line is disposed. Wherein, the transmission line may be a power signal line or a data signal line.

Specifically, as shown in FIG. 1, the body 2 may comprise many functional modules such as a display device 4, a data processing module, a power supply module, a motion sensor, and a wireless transmission module. The power supply module can provide power for each functional module. In the process that the user wears the wearable device, the motion sensor can detect the user's motion data such as rotation angle, angular acceleration, and linear acceleration, etc. and send the motion data to the data processing module. According to the received motion data, the data processing module can calculate the motion parameters of the user such as motion trajectories, motion distances, and motion speeds, etc. The motion parameters can be displayed by the display device 4 or can be sent to the user's terminal such as mobile phone or computer by wireless transmission module.

In the embodiment of present disclosure, the display device 4 and the data processing module are disposed on one body 2. The power supply module, the motion sensor, and the wireless transmission module are disposed on the other body 2. It should be noted that, the display device 4 may also be disposed on two bodies 2 simultaneously. In other words, the display device 4 is bridged between the two bodies 2. However, the display device 4 will block the opening structure 3 between the two bodies 2 connected by the connector 1, which has a great effect on the heat dissipation of the user's skin.

Since the body 2 is arc-shaped, preferably, the display device 4 is a flexible display device, such as an OLED display device. In this way, the surface of the flexible display device can completely fit with the surface of the body 2 to make the surface of the wearable device flat and aesthetic.

Figure 2:
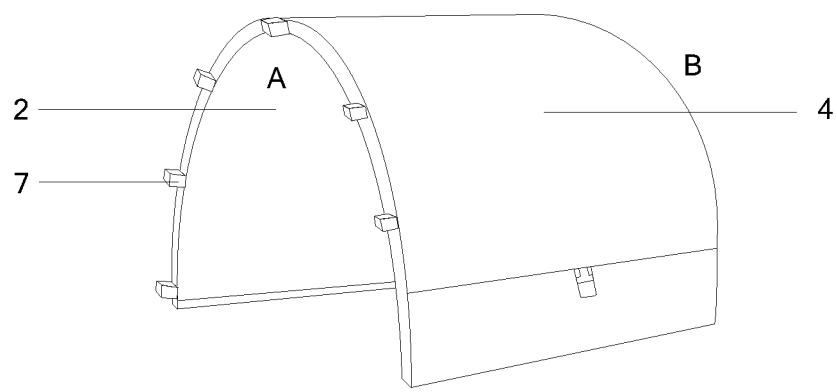
FIG. 2 is a schematic structural view of a body of FIG. 1.
Figure 3:
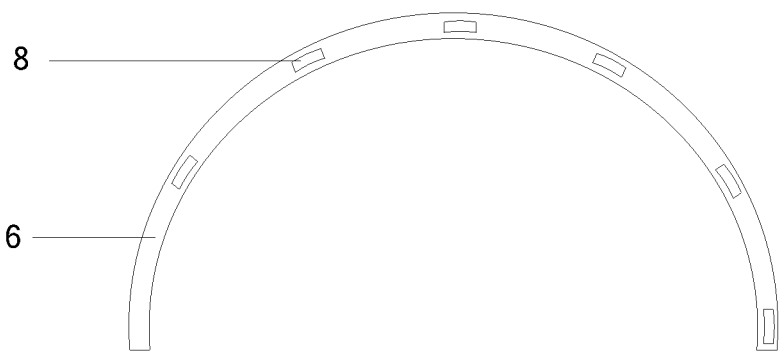
FIG. 3 is a schematic structural view of a restriction bar in FIG. 1.

As shown in FIG. 1, FIG. 2 and FIG. 3, the wearable device may further comprise a curved restriction bar 6. The restriction bar 6 is connected to a periphery of the body 2 from one side of the wearable device where a wear part enters.

Specifically, when the user wears the wearable device, the restriction bar 6 can avoid a large deformation of the body 2 connected with the restriction bar 6. Accordingly, the damage of the body 2 due to a large deformation can be avoided. In the embodiment of the present disclosure, the connection between the restriction bar 6 and the side surface of the display device 4 is described as an example. In this way, the restriction bar 6 can prevent the display device 4 from displaying abnormally due to a large deformation.

Preferably, two restriction bars 6 are provided, and the two restriction bars 6 are respectively disposed along two sides of the wearable device where a wear part enters, and are respectively connected with two sides of the body 2. For example, the two restriction bars 6 are connected to the peripheries of the display device 4 of the body 2 respectively, or connected to the peripheries of the main body portion 5 of the body 2 respectively. In this way, the restriction bar 6 can better prevent the body 2 from a large deformation.

The connection between the restriction bar 6 and the body 2 will be described in detail with reference to FIG. 1, FIG. 2 and FIG. 3.

As shown in FIG. 1, FIG. 2 and FIG. 3, a first protrusion 7 is provided on the periphery of the body 2 from one side of the wearable device where the wear part enters, and a first groove 8 is provided on the restriction bar 6. The first protrusion 7 is connected with the first groove 8 so that the body 2 and the restriction bar 6 are connected.

Specifically, the display device 4 of the body 2 is provided with a first protrusion 7 on a side surface (periphery) of the wearable device where the wear part enters, and a first groove 8 is provided at position of the restriction bar 6 corresponding to a side surface of the display device 4. The first protrusion 7 fits the first groove 8 to connect the display device 4 and the restriction bar 6. In the embodiment of the present disclosure, for example, a plurality of first protrusions 7 are disposed on the side surface of the display device 4, and a plurality of first grooves 8 are disposed on the restriction bar 6. Therefore, the connection effect between the display device 4 and the restriction bar 6 is good. Definitely, it is also feasible that only one first protrusion 7 is provided on the side surface of the display device 4, and one first groove 8 is provided on the restriction bar 6.

It should be noted that it is also feasible that the main body portion 5 of the body 2 is provided with a first protrusion 7 on a side surface (periphery) of the wearable device where the wear part enters, and the corresponding restriction bar 6 connects with the body 2. In this way, the restriction bar 6 can avoid large deformation of the body 2 connected thereto, and accordingly avoid large deformation of the functional module located on the body 2.

As shown in FIG. 2 and FIG. 3, the size of the first groove 8 is larger than that of the first protrusion 7, and the first protrusion 7 is slidably connected with the first groove 8. The 'size' referred here may be length or width. In other words, when the wearable device is deformed, relative sliding between the display device 4 and the restriction bar 6 may occur, so that the display device 4 may be further prevented from a large deformation.

It should be noted that it is also feasible that the first groove 8 is engaged with the first protrusion 7. Comparing with the manner that the first groove 8 is slidably connected with the first protrusion 7, the manner that the first groove 8 is engaged with the first protrusion 7 is less effective for avoiding the large deformation of the display device 4.

Restriction bar 6 and body 2 may also be connected by magnetic attraction. Specifically, the body 2 is provided with a first magnetic member on the surface of the wearable device for the side where the wear part enters, and the surface of the restriction bar 6 corresponding to the body 2 is provided with a second magnetic member. The first magnetic member and the second magnetic members can attract each other. The above-mentioned magnetic-attracted connection structure is relatively simple, and the design can be flexible. However, the weight of the magnetic members in the magnetic-attracted connection structure is heavy. Thereby affecting the overall weight of the wearable device, and the magnetic field generated by the magnetic member easily affects the electrical signal output by the functional module, and further affecting the accuracy of the functionality of the wearable device.

Figure 4:
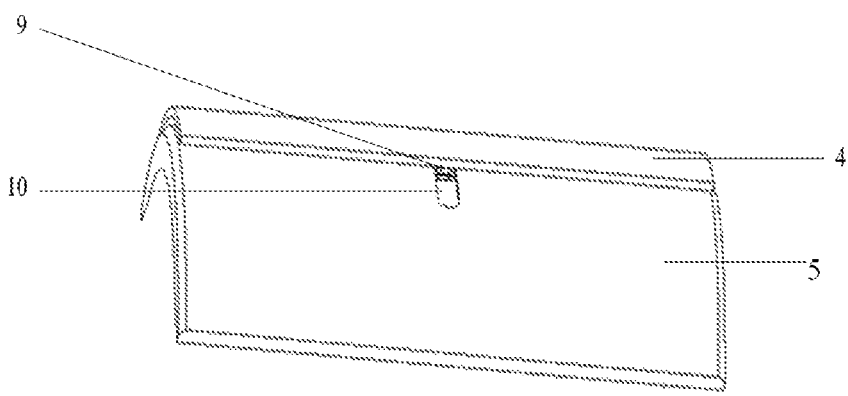
FIG. 4 is a schematic view of a connection structure of a main body and a display device in FIG. 1.
Figure 5:
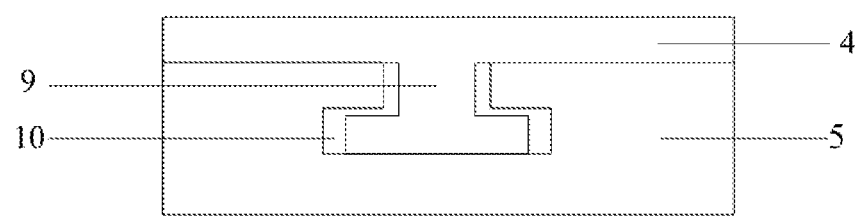
FIG. 5 is a sectional view of the connection structure of the main body and the display device in FIG. 1.

As shown in FIG. 1, FIG. 4 and FIG. 5, a second protrusion 9 is disposed on a surface of the display device 4 that is attached to the main body portion 5. A second groove 10 is disposed on the main body portion 5. The second protrusion 9 is connected with the second groove 10, so as to connect the display device 4 and the main body portion 5.

Specifically, in the embodiment of the present disclosure, a second protrusion 9 is provided on a surface of the display device 4 that is attached to the main body portion 5 of the body 2. The second protrusion 9 is provided adjacent to the connector 1. The second protrusion 9 fits the second groove 10 so that the display device 4 and the main body portion 5 are connected. Definitely, it is also feasible to provide the second protrusion 9 at other positions on the surface of the display device 4 that is attached to the main body portion 5.

In the embodiment of the present disclosure, a second protrusion 9 is provided on the surface of the display device 4 that is attached to the main body portion 5 as an example for illustration. Definitely, it is also feasible that a plurality of second protrusions 9 provided on the surfaces of the display device 4 that is attached to the main body portion 5. The plurality of second protrusions 9 are respectively connected with the corresponding second grooves 10, so that the fastness of the connection between the display device 4 and the body 2 can be further improved.

As shown in FIG. 4 and FIG. 5, the length of the second groove 10 is greater than that of the second protrusion 9, and the second protrusion 9 is slidably connected with the second groove 10. In this way, when the main body portion 5 is deformed, the display device 4 can relatively slide with the main body portion 5, so that the display device 4 can be prevented from being greatly deformed.

It should be noted that, it is also feasible that the second groove 10 is engaged with the second protrusion 9. Comparing with the manner that the second groove 10 is slidably connected with the second protrusion 9, the manner that the second groove 10 is engaged with the second protrusion 9 is less effective for avoiding the large deformation of the display device 4.

It should also be noted that it is also feasible that the main body portion 5 and the display device 4 are connected by magnetic attraction. Specifically, a first magnetic member is disposed on a side surface of the display device 4 adjacent to the main body portion 5, and a second magnetic member is disposed on a side surface of the main body portion 5 adjacent to the display device 4. The first magnetic member and the second magnetic member can be attracted to each other. Although the magnetic-attracted connection structure is relatively simple and the design can be flexible. However, the weight of the magnetic member in the magnetic-attracted connection structure is heavy, and the magnetic field generated by the magnetic member easily affects the electrical signal output by the functional module.

It can be understood that the above embodiments are merely exemplary embodiments for illustrating the principle of the present disclosure, but the present disclosure is not limited thereto. For a person of ordinary skilled in the art, various variations and improvements may be made without departing from the spirit and essence of the present disclosure, and these variations and improvements are also considered to be within the protection scope of the present disclosure.

The invention claimed is:

1. A wearable device, comprising:
   a connector, and
   at least two bodies,
   the connector is used to connect two of the at least two bodies, an opening structure is formed between portions of the two of the at least two bodies connected by the connector,
   wherein each of the at least two bodies comprises a main body portion and a display device provided on the main body portion;
   the connector has a hollow structure in which a transmission line is disposed, and
   wherein the wearable device further comprises a curved restriction bar, the restriction bar is connected to a periphery of each of the at least two bodies from one side of the wearable device where a wear part enters.

2. The wearable device according to claim 1, wherein each of the at least two bodies has an arc shape and the wearable device has a cylindrical shape.

3. The wearable device according to claim 2, wherein a material of the connector is an elastic material.

4. The wearable device according to claim 3, wherein the connector is in a shape of a straight strip or a bent strip.

5. The wearable device according to claim 4, wherein the connector is a U-shaped, a V-shaped, or a W-shaped bent strip.

6. The wearable device according to claim 1, wherein a first protrusion is provided on the periphery of each of the at least two bodies from one side of the wearable device where the wear part enters, and a first groove is provided on the restriction bar;

the first protrusion is engaged with the first groove; or size of the first groove is larger than size of the first protrusion, so that the first protrusion is slidably connected with the first groove.

7. The wearable device according to claim 1, wherein a second protrusion is provided on a surface of the display device that is attached to the main body portion, and a second groove is provided on the main body portion;

the second protrusion is engaged with the second groove; or size of the second groove is larger than size of the second protrusion, so that the second protrusion is slidably connected with the second groove.

* * * * *